United States Patent [19]
Campbell

[11] Patent Number: 5,259,714
[45] Date of Patent: Nov. 9, 1993

[54] BLIND FASTENER ASSEMBLY

[76] Inventor: James Campbell, 24880 63rd Ave., Los Molinos, Calif. 96055

[21] Appl. No.: 994,341

[22] Filed: Dec. 21, 1992

[51] Int. Cl.⁵ .................... F16B 13/04; F16B 13/06
[52] U.S. Cl. ........................... 411/34; 411/55; 411/59
[58] Field of Search ................. 411/34–38, 411/55, 60, 61, 59, 405

[56] References Cited

U.S. PATENT DOCUMENTS

| | | | |
|---|---|---|---|
| 3,834,270 | 9/1974 | Triplett et al. | 411/38 |
| 4,416,572 | 11/1983 | Black | 411/38 |
| 4,869,629 | 9/1989 | Witzigman | 411/38 |

FOREIGN PATENT DOCUMENTS

| | | | |
|---|---|---|---|
| 1025766 | 1/1953 | France | 411/405 |
| 2338628 | 8/1977 | France | 411/405 |

*Primary Examiner*—Neill R. Wilson
*Attorney, Agent, or Firm*—Leon Gilden

[57] ABSTRACT

An anchor member having an anchor tube formed with an anchor plate orthogonally mounted to the tube, including slots directed through the tube to ease deformation of the tube upon internally threaded tube portion and drawn towards the anchor plate by a bolt member directed through the tube structure. The anchor plate includes a plurality of diametrically opposed apertures to receive a spanner tool structure to effect securement of the tube relative to the bolt structure.

1 Claim, 3 Drawing Sheets

FIG 7
FIG 8
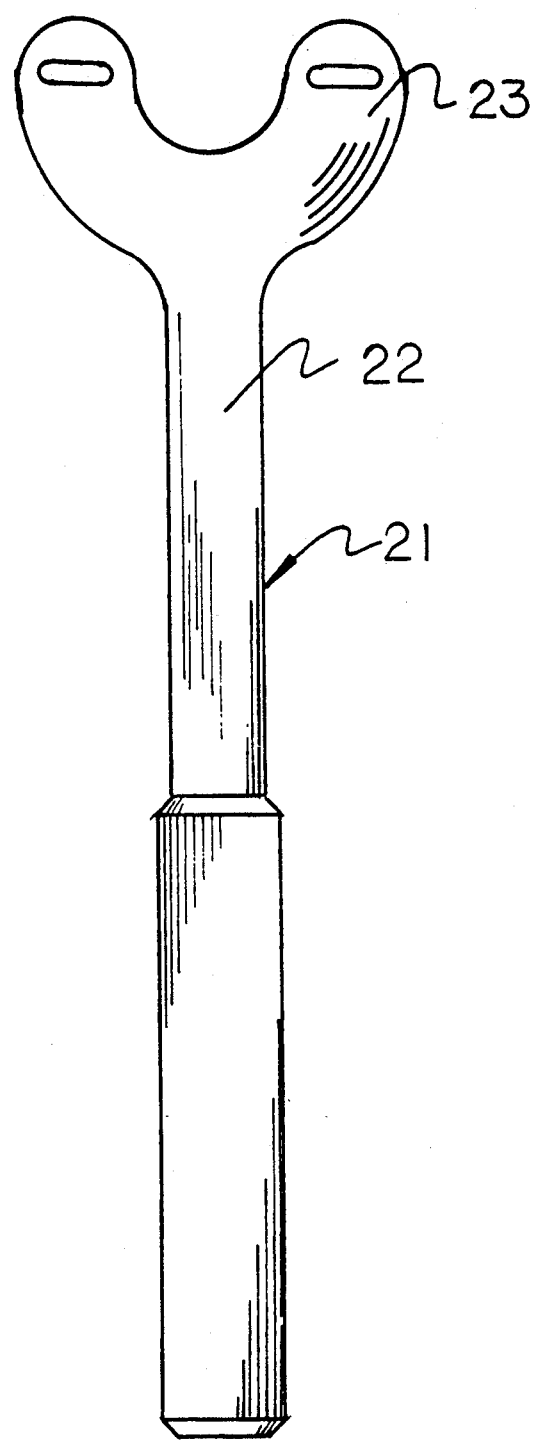
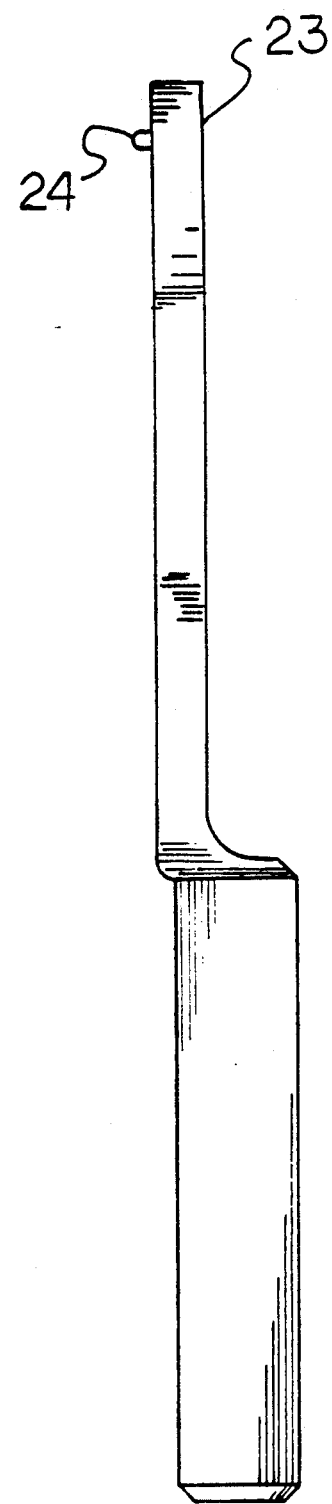

BLIND FASTENER ASSEMBLY

BACKGROUND OF THE INVENTION

1. Field of the Invention

The field of invention relates to fastener apparatus, and more particularly pertains to a new and improved blind fastener assembly utilizing a bolt and anchor member operative to effect securement of a plurality of workpieces together.

2. Description of the Prior Art

Blind fastener structure is indicated in the prior art, such as in U.S. Pat. No. 4,919,577; 3,537,271; 5,009,556; 3,521,521; and 4,832,548.

The instant invention is addressed to overcome deficiencies of the prior art by providing for easily positioned anchor tube cooperative with a bolt member to effect expansion of the anchor tube in the securement of a plurality of workpieces together and in this respect, the present invention substantially fulfills this need.

SUMMARY OF THE INVENTION

In view of the foregoing disadvantages inherent in the known types of fastener structure now present in the prior art, the present invention provides a blind fastener assembly wherein the same is directed for the securement of a plurality of workpieces together. As such, the general purpose of the present invention, which will be described subsequently in greater detail, is to provide a new and improved blind fastener assembly which has all the advantages of the prior art blind fastener structure and none of the disadvantages.

To attain this, the present invention provides an anchor member having an anchor tube formed with an anchor plate orthogonally mounted to the tube, including slots directed through the tube to ease deformation of the tube upon internally threaded tube portion and drawn towards the anchor plate by a bolt member directed through the tube structure. The anchor plate includes a plurality of diametrically opposed apertures to receive a spanner tool structure to effect securement of the tube relative to the bolt structure.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved blind fastener assembly which has all the advantages of the prior art blind fastener structure and none of the disadvantages.

It is another object of the present invention to provide a new and improved blind fastener assembly which may be easily and efficiently manufactured and marketed.

It is a further object of the present invention to provide a new and improved blind fastener assembly which is of a durable and reliable construction.

An even further object of the present invention is to provide a new and improved blind fastener assembly which is susceptible of a low cost of manufacture with regard to both materials and labor, and which accordingly is then susceptible of low prices of sale to the consuming public, thereby making such blind fastener assemblies economically available to the buying public.

Still yet another object of the present invention is to provide a new and improved blind fastener assembly which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 7 is an orthographic top view of a typical spanner wrench for use by the invention.

FIG. 8 is an orthographic side view of the spanner wrench as set forth in FIG. 7.

DESCRIPTION OF THE PREFERRED EMBODIMENT

Figure 1:
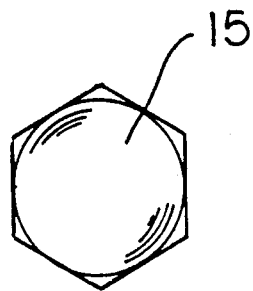
FIG. 1 is an orthographic top view of the bolt member.
Figure 3:
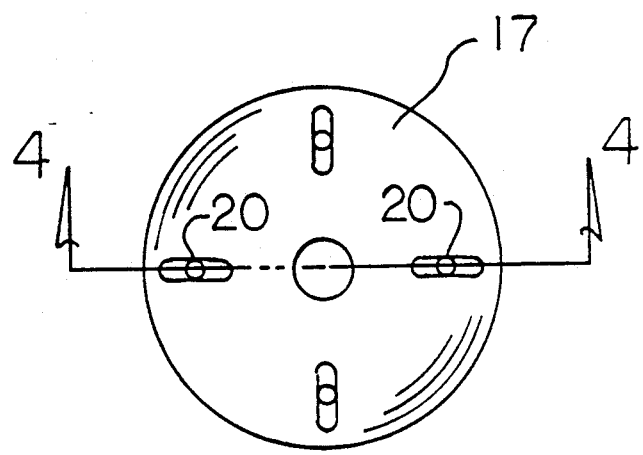
FIG. 3 is an orthographic top view of the anchor member.
Figure 2:
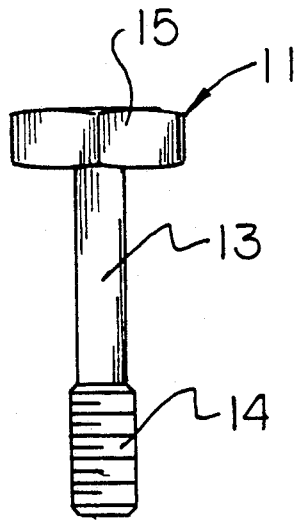
FIG. 2 is an orthographic side view of the bolt member.
Figure 4:
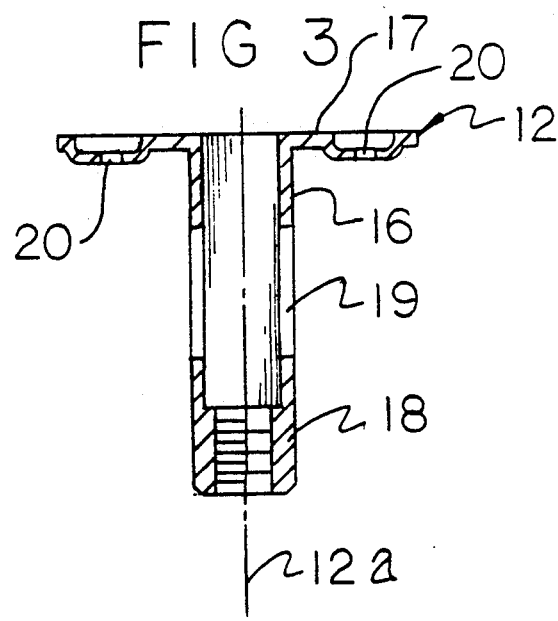
FIG. 4 is an orthographic view, taken along the lines 4—4 of FIG. 3 in the direction indicated by the arrows.

With reference now to the drawings, and in particular to FIGS. 1 to 8 thereof, a new and improved blind fastener assembly embodying the principles and concepts of the present invention and generally designated by the reference numeral 10 will be described.

Figure 5:
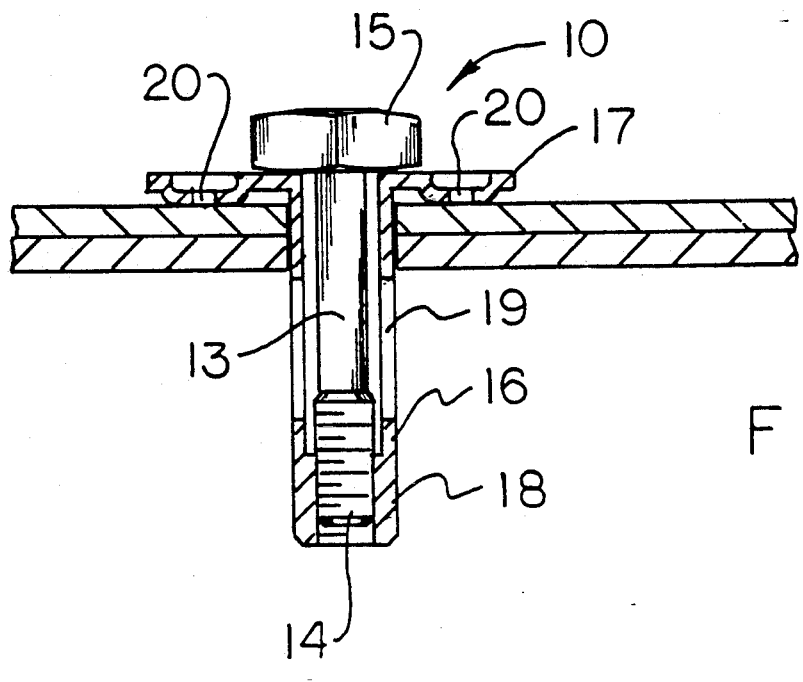
FIG. 5 is an orthographic view in cross-section of the assembly in a first position to secure a plurality of workpieces together.
Figure 6:
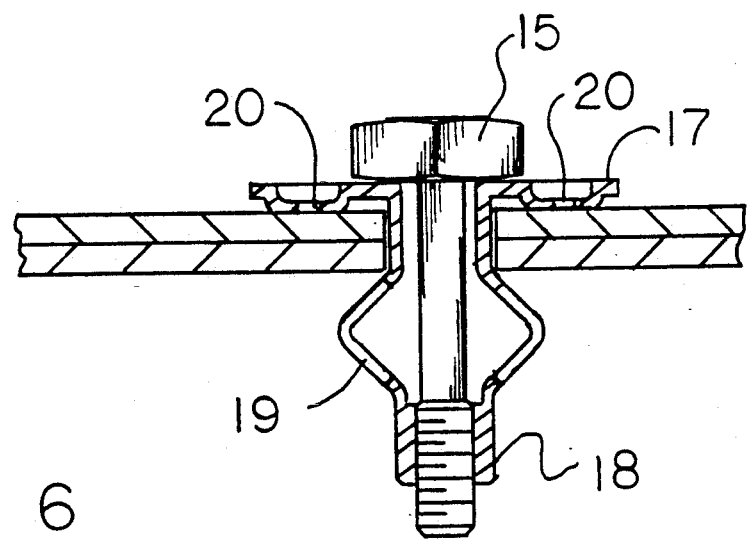
FIG. 6 is an orthographic cross-sectional illustration of the invention indicating the assembly in a second position to secure the workpieces together.

More specifically, the blind fastener assembly 10 of the instant invention essentially comprises a bolt member 11 cooperatively received within an anchor member 12 for securing a plurality of workpieces together, in a manner as indicated in FIGS. 5 and 6. The bolt member 11 includes a bolt shank 13 having a first diameter, with the shank having a shank first end having a shank head 15 thereon. A threaded shank portion 14 is integral to a second end of the shank 13. The shank 13 is of a first diameter, wherein the threaded shank portion 14 is of a second diameter greater than the first diameter, with the shank head 15 of a third diameter greater than the second diameter.

The anchor member 12 includes a cylindrical anchor tube having an internal tube diameter substantially greater than the second diameter, with an anchor plate 17 orthogonally mounted to the first end of the anchor tube 16 orthogonally oriented relative to the axis 12a of the anchor tube 16, as the anchor tube 16 is symmetrically oriented about the axis 12a. The anchor tube further includes a tube internally threaded lowermost portion 18 at a second end of the anchor tube directed interiorly of the anchor tube having internally threaded portion substantially equal to the second diameter to threadedly cooperative with the threaded shank portion 14. The anchor tube 16 includes a plurality of parallel slots 19 arranged parallel relative to one another and to the axis 12a to assist in the deformation of the anchor tube when the bolt shank 13, and more specifically, the threaded shank portion 14 threadedly directs the anchor tube internally threaded portion 18 towards the anchor plate 17. To permit securement of the anchor plate during rotation of the bolt member 11, a plurality of anchor plate bores 20 are directed through the anchor plate for accommodating a spanner wrench. A spanner wrench indicated as a tool member 21 in the FIGS. 7 and 8 includes a tool shank 22 having a U-shaped tool head 23, including a plurality of projections 24, with one of the projections received within one of the anchor plate bores 20 for securement of the anchor plate.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A blind fastener assembly, comprising, a bolt member and an anchor member, the bolt member received within the anchor member, and the bolt member having a bolt shank having a first diameter, with the bolt shank having a shank first end and a shank second end, the shank first end having a shank head fixedly mounted to the shaft first end, the shank second end having a threaded shank portion integral with the second end extending from the second end along the bolt shank, with the threaded shank portion having a second diameter greater than the first diameter, the shank head having a third diameter greater than the second diameter, and the anchor member includes a cylindrical anchor tube having an internal tube diameter greater than the second diameter and symmetrically oriented about an axis, and the anchor tube having a tube first end and a tube second end, the tube first end including an anchor plate fixedly mounted to the tube first end orthogonally oriented relative to the axis, and the anchor tube further including a tube internally threaded portion extending from the tube second end interiorly a predetermined distance within the anchor tube, with the tube internally threaded portion arranged for threadedly receiving the threaded shank portion therewithin, and the anchor tube having a plurality of parallel slots directed through the anchor tube parallel relative to one another and to the axis and positioned between the anchor plate and the tube internally threaded portion, and the shank head having a plurality of anchor plate bores directed through the anchor plate, wherein the anchor plate bores are diametrically opposed relative to one another on opposed sides of the anchor tube for receiving a spanner wrench within the bores.

* * * * *